United States Patent
Peterson

Patent Number: 5,694,781
Date of Patent: Dec. 9, 1997

[54] CONTROL ALGORITHM FOR VEHICLE AIR CONDITIONING SYSTEM WITH A VARIABLE ORIFICE

[75] Inventor: Gregory E. Peterson, Sylvan Lake, Mich.

[73] Assignee: Smart Power Systems, Inc., Sterling Heights, Mich.

[21] Appl. No.: 688,999

[22] Filed: Aug. 1, 1996

[51] Int. Cl.⁶ ..................... B60H 3/00
[52] U.S. Cl. ............. 62/133; 62/228.3; 62/243; 62/323.4
[58] Field of Search ............. 62/133, 228.1, 62/228.3, 230, 226, 227, 157, 158, 231, 208, 209, 243, 323.1, 323.4

[56] References Cited

U.S. PATENT DOCUMENTS

| | | | |
|---|---|---|---|
| 4,275,688 | 6/1981 | Abe et al. | 62/133 X |
| 4,424,682 | 1/1984 | Miska et al. | 62/133 |
| 4,510,763 | 4/1985 | Johnson | 62/228.3 X |
| 4,596,121 | 6/1986 | Ogata | 62/133 |
| 5,457,965 | 10/1995 | Blair et al. | 62/228.3 X |

*Primary Examiner*—Harry B. Tanner
*Attorney, Agent, or Firm*—Brooks & Kushman P.C.

[57] ABSTRACT

The present invention provides a vehicle air conditioning system including a condenser, condenser fan, a variable expansion device, an evaporator, evaporator fan, and a compressor. A processor is provided in cooperation with the compressor for temporarily interrupting compressor operation under certain predetermined operating conditions in order to prevent sticking of the variable expansion device. Various algorithms and initial algorithm engagement parameters are provided for temporarily interrupting compressor operation under certain predetermined operating conditions.

15 Claims, 5 Drawing Sheets

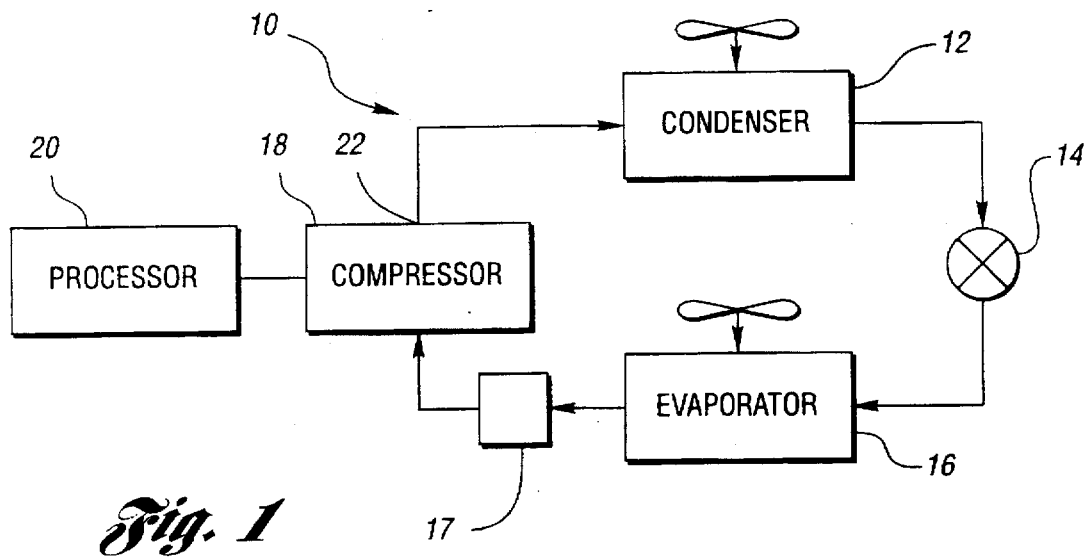
*Fig. 1*
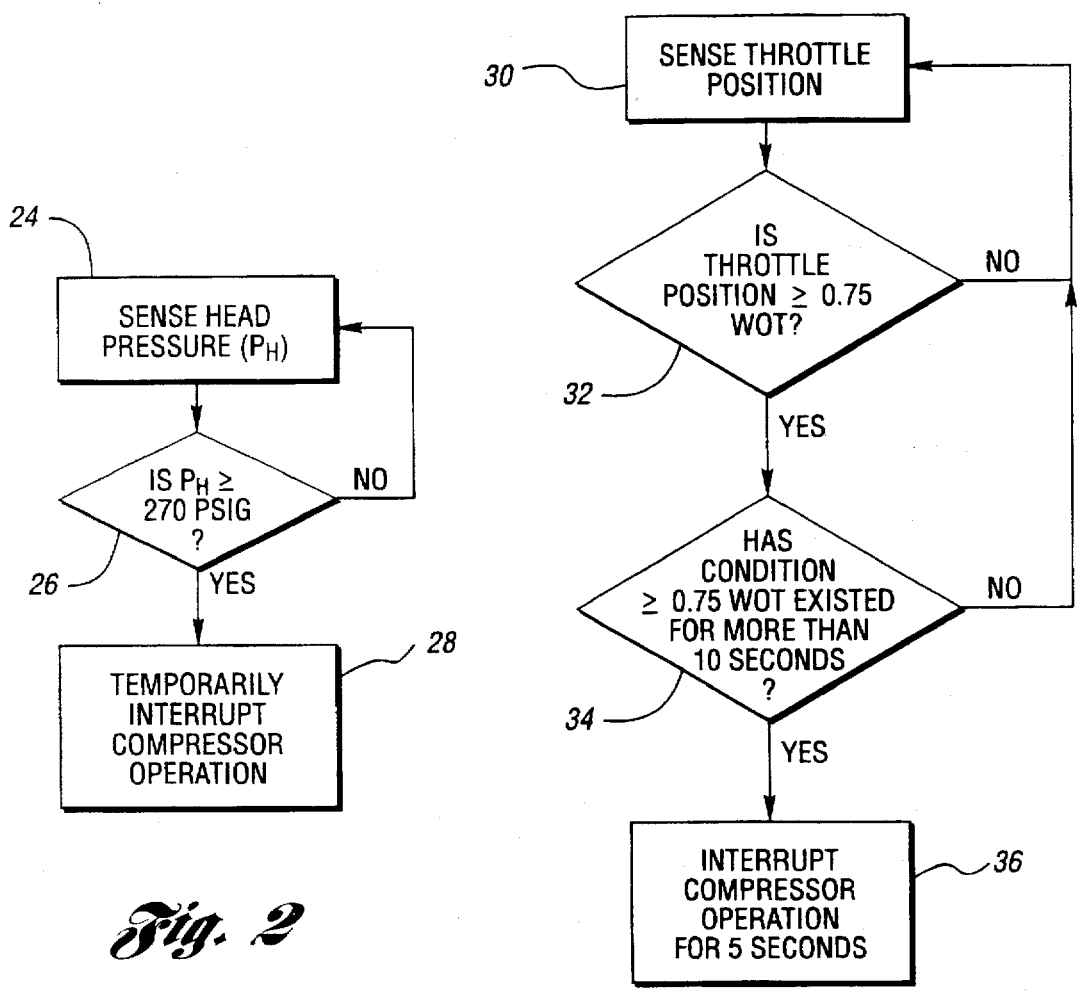
*Fig. 2*
*Fig. 3*

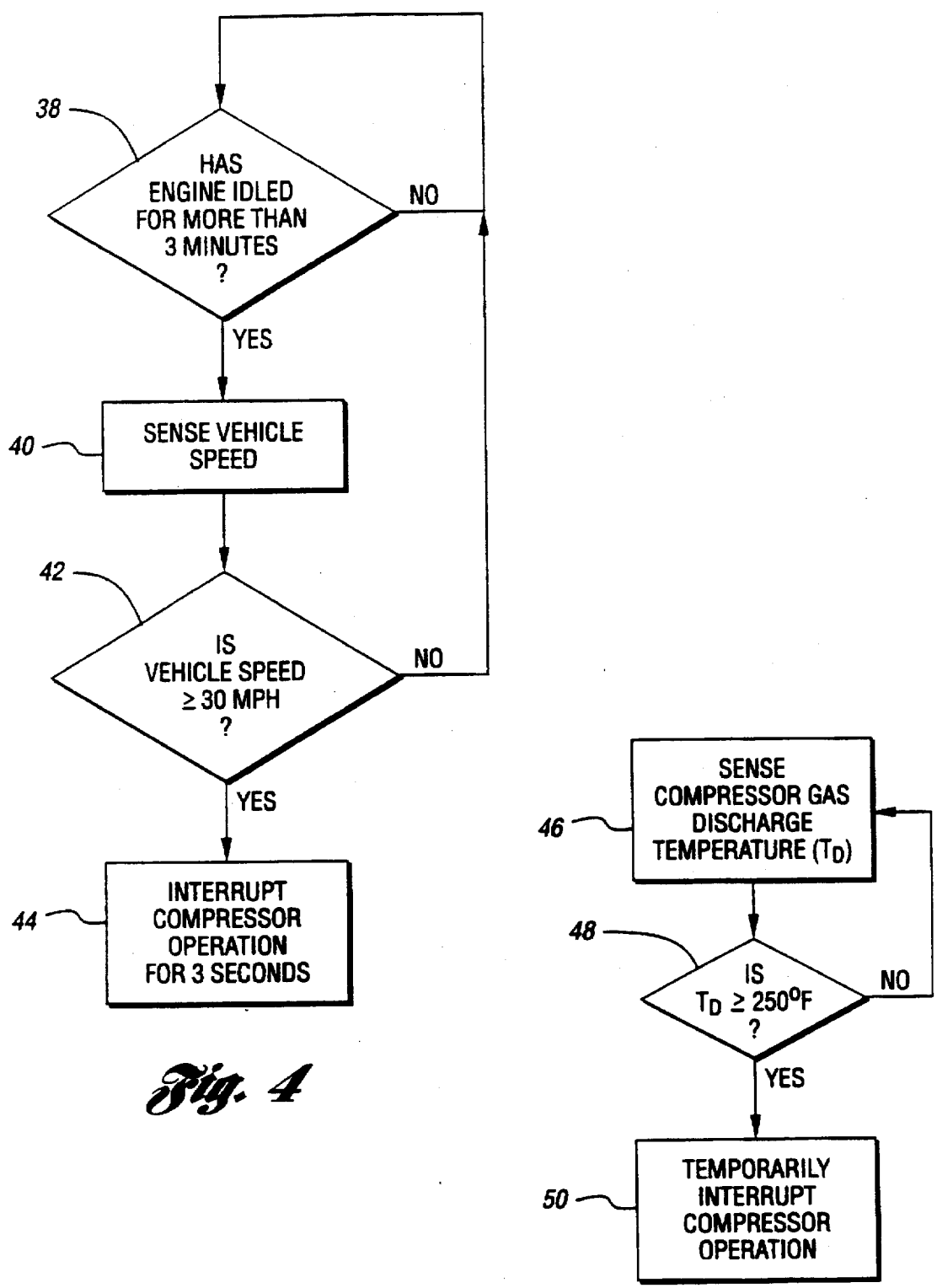

CONTROL ALGORITHM FOR VEHICLE AIR CONDITIONING SYSTEM WITH A VARIABLE ORIFICE

TECHNICAL FIELD

The present invention relates to vehicle air conditioning systems, and more particularly to control algorithms for preventing a lock-in condition whereby the orifice regulates at a smaller than desired orifice area in such an air conditioning system.

BACKGROUND OF THE INVENTION

Many current automotive air conditioning systems utilize a CCOT (Cycling Clutch Orifice Tube) control means. This system incorporates a fixed area expansion device that is sized to give acceptable thermodynamic performance over a wide range of operating conditions.

A new development in automotive air conditioning systems is described in U.S. patent application Ser. No. 08/598, 646, which provides a pressure regulated variable flow orifice valve assembly. This device improves the air conditioning system performance by reducing the orifice area when appropriate to produce cooler discharge air for the passenger compartment. A variable area thermally controlled orifice is described in U.S. Pat. No. 5,479,786.

It is particularly desirable to have the capability of varying the orifice size as a function of the system refrigerant flow rate to optimize sub-cooling. This typically reduces the discharge air temperatures and also requires less compressor work, especially at idle and low speed conditions.

A potential problem with such variable orifices is that they may stick or "lock in" to a non-optimal size under certain operating conditions. It therefore is desirable to provide a system for preventing "lock in" of a variable orifice under various operating conditions.

DISCLOSURE OF THE INVENTION

The present invention enhances the use of variable flow orifice valves by providing control algorithms for temporarily interrupting compressor operation under predetermined operating conditions. When the compressor is interrupted, the compressor head pressure drops, which allows the variable orifice to move in a manner to further open the orifice. Accordingly, a lock-in condition of the variable orifice is prevented.

A method is provided for preventing sticking of a variable orifice in a vehicle air conditioning system which includes a compressor with a compressor outlet having a measurable head pressure and a variable orifice in fluid communication with the compressor outlet. The method comprises temporarily interrupting compressor operation under certain predetermined operating conditions in a manner to cause the head pressure to drop, thereby causing the variable orifice to open further to prevent a lock-in condition.

In a preferred embodiment, the step of temporarily interrupting compressor operation under certain predetermined operating conditions comprises sensing the head pressure and turning off the compressor if the compressor head pressure is greater than approximately 240 psig.

In a further embodiment, the step of interrupting compressor operation under certain predetermined operating conditions comprises cycling the compressor off for a predetermined period of time if the vehicle engine is operated at greater than approximately 0.75 wide open throttle for more than approximately ten seconds.

In a further embodiment, the step of interrupting compressor operation comprises cycling the compressor off for a period of approximately three seconds when the vehicle is operated at a speed of greater than approximately thirty miles per hour following an idling period of greater than approximately three minutes with the compressor on.

In yet another embodiment, the step of interrupting compressor operation comprises sensing the compressor gas discharge temperature and cycling the compressor off if the sensed discharge gas temperature is greater than approximately 250° F.

In a further embodiment, the step of interrupting compressor operation under certain predetermined operating conditions comprises cycling the compressor off if the engine rpm and ambient temperature are above certain predetermined levels for a predetermined period of time.

Accordingly, an object of the present invention is to provide a method of preventing lock-in of a variable orifice in a vehicle air conditioning system.

A further object of the present invention is to provide an algorithm for temporarily interrupting compressor operation under certain operating conditions to prevent lock-in of the variable orifice.

The above objects and other objects, features and advantages of the present invention are readily apparent from the following detailed description of the best modes for carrying out the invention when taken in connection with the accompanying drawings.

BRIEF DESCRIPTION OF THE DRAWINGS

FIG. 1 shows a schematic flow diagram of an air conditioning system in accordance with the present invention;

FIG. 2 shows a control flow chart in accordance with a first embodiment of the present invention;

FIG. 3 shows an algorithm flow chart in accordance with a second embodiment of the present invention;

FIG. 4 shows an algorithm flow chart in accordance with a third embodiment of the present invention;

FIG. 5 shows an algorithm flow chart in accordance with a fourth embodiment of the present invention; and FIGS. 6a–c show an algorithm flow chart in accordance with a fifth embodiment of the present invention.

DETAILED DESCRIPTION OF THE PREFERRED EMBODIMENTS

Figure 6B:
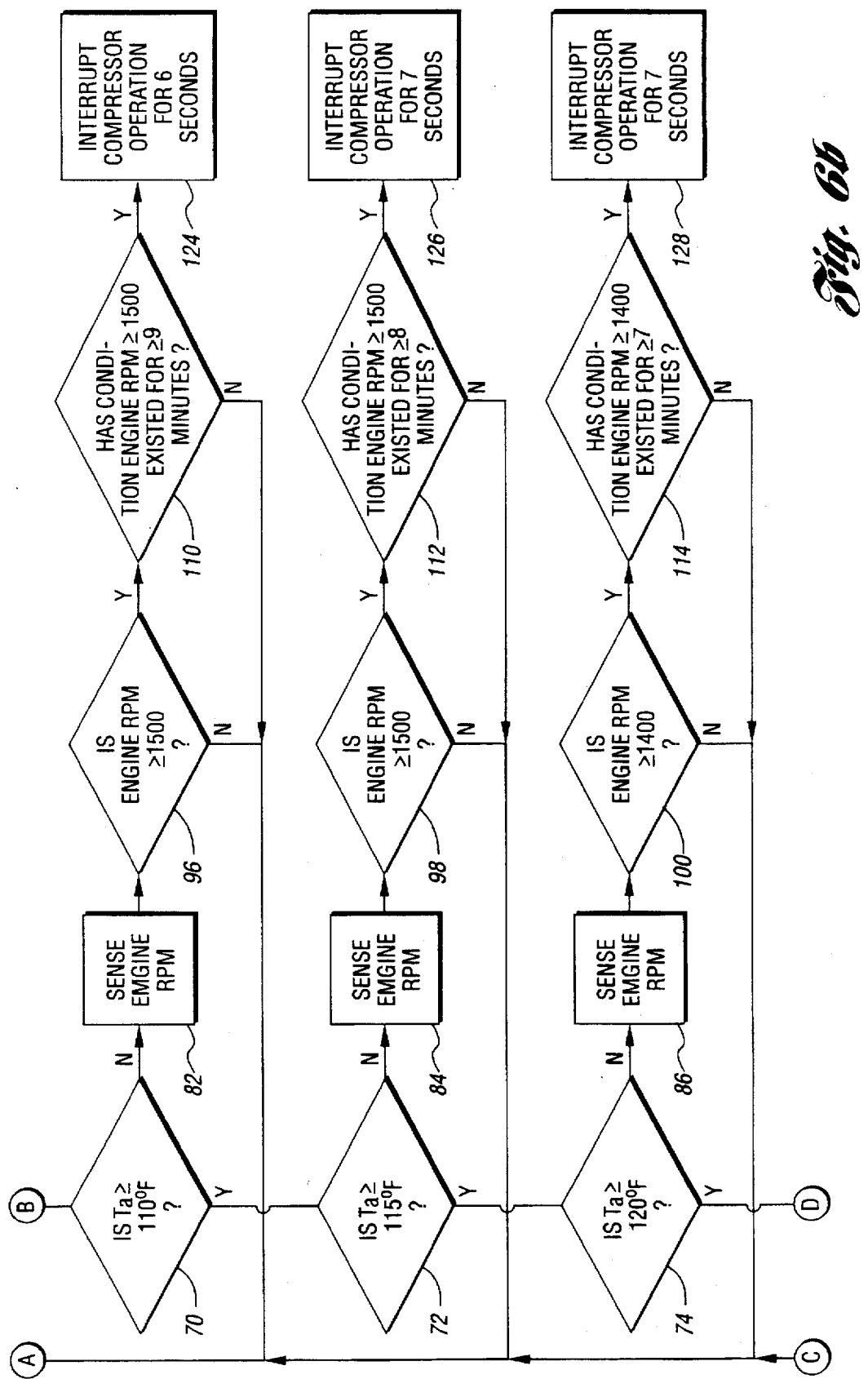
Figure 6B:
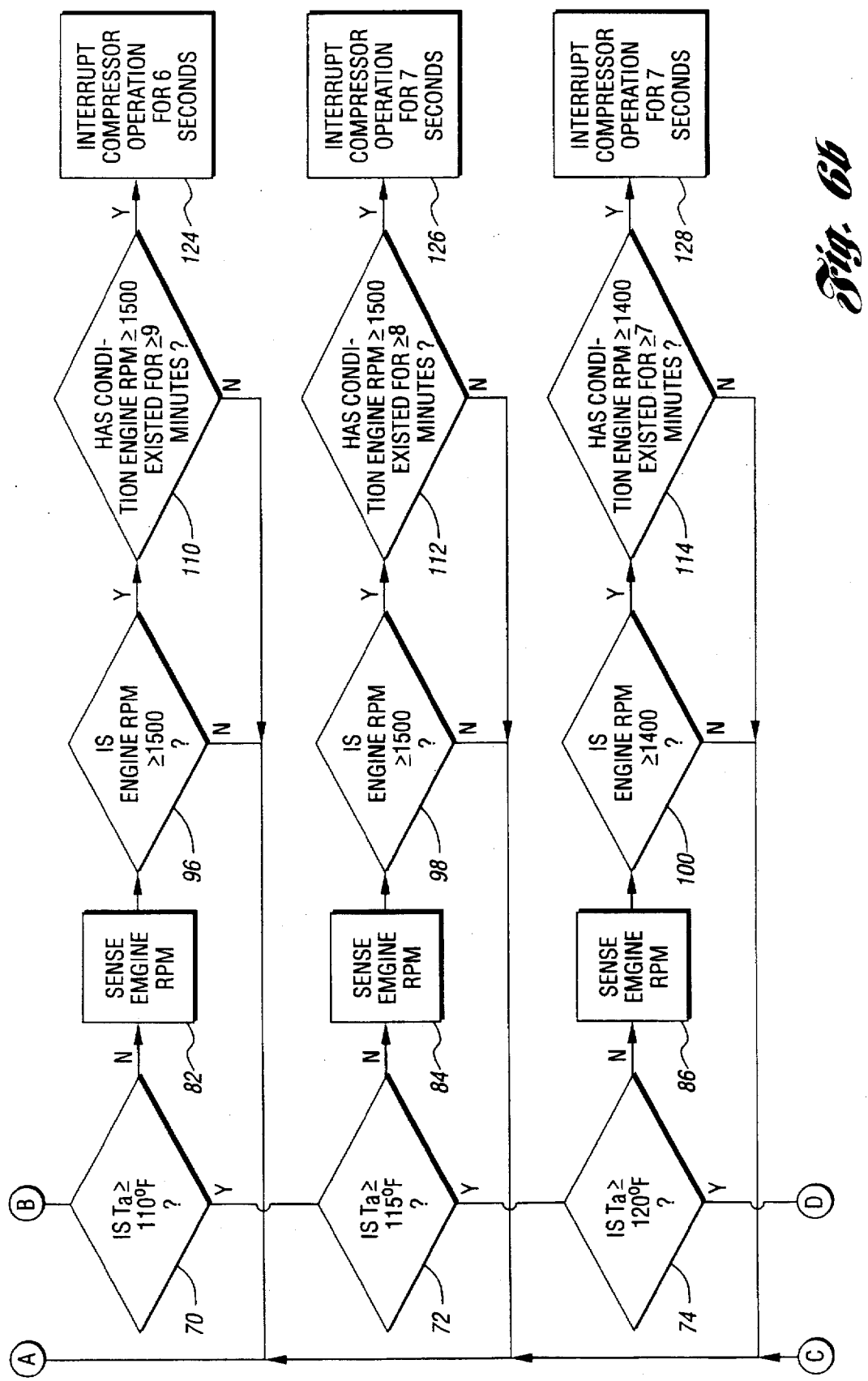

FIG. 1 schematically illustrates a vehicle air conditioning system 10 in accordance with the present invention. The air conditioning system 10 includes a condenser 12, expansion device 14, evaporator 16, accumulator/drier 17 and compressor 18. The expansion device 14 is preferably a variable orifice. To prevent lock-in of the variable orifice at a smaller than desired orifice area, the processor 20 is provided for temporarily interrupting compressor operation under certain predetermined operating conditions.

FIG. 2 illustrates a first embodiment of an algorithm engagement parameter for interrupting operation of the compressor 18 to prevent lock-in of the variable orifice 14. This parameter comprises sensing the head pressure at the compressor outlet 22 (step 24), determining if the head pressure is greater than or equal to 270 psig (step 26), and temporarily interrupting compressor operation if the head pressure is greater than or equal to 270 psig (step 28).

FIG. 3 schematically illustrates an algorithm for use in the processor 20 for temporarily interrupting compressor operation in accordance with a second embodiment of the present invention. This algorithm comprises: sensing throttle position (step 30); determining if throttle position is greater than or equal to 0.75 wide open throttle (step 32); determining if the condition of step 32 has existed for more than ten seconds (step 34); and interrupting compressor operation for five seconds if steps 32 and 34 are satisfied (step 36). This algorithm would be particularly useful in a highway patrol vehicle or other vehicle which requires extended periods of sustained acceleration.

FIG. 4 shows an algorithm for use with the processor 20 in temporarily interrupting compressor operation 18 in accordance with a third embodiment of the present invention. This algorithm comprises the following steps: (a) determining if the engine has idled for more than three minutes (step 38); (b) sensing vehicle speed (step 40) if step 38 is satisfied; (c) determining if vehicle speed is greater than or equal to thirty miles per hour (step 42); and (d) interrupting compressor operation for three seconds if the vehicle speed is greater than or equal to thirty miles per hour (step 44

FIG. 5 schematically illustrates a method of temporarily interrupting compressor operation under predetermined operating conditions in accordance with a fourth embodiment of the present invention. This embodiment comprises sensing the compressor gas discharge temperature at the compressor outlet 22 (step 46); determining if the discharge temperature is greater than or equal to 250° F. (step 48); and temporarily interrupting compressor operation if the discharge temperature is greater than or equal to 250° F. (step 50). If the discharge temperature is allowed to exceed 250° F., the compressor interior can be overheated and damaged, and elevated metal temperatures and oil breakdown can result. In order to accomplish this method, a thermal switch is provided on the compressor discharge gas line in communication with the compressor outlet 22.

Figure 6C:
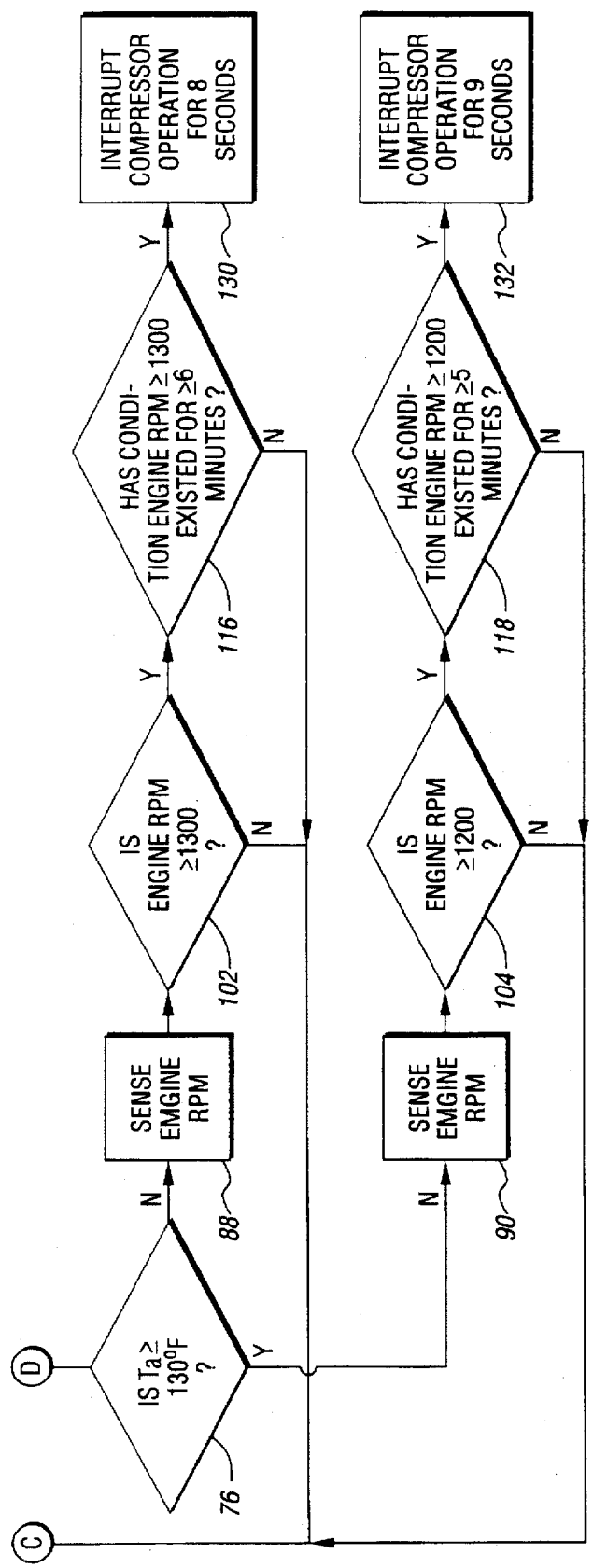

FIGS. 6a–c illustrate an algorithm for use with the processor 20 for temporarily interrupting compressor operation 18 in accordance with a fifth embodiment of the present invention. This embodiment comprises the following steps: sensing the ambient temperature (step 52); determining if the ambient temperature is greater than 90° F. (step 54); if step 54 is not satisfied, then returning to step 52; if step 54 is satisfied, then determining if the ambient temperature is greater than 95° F. (step 56); if step 56 is not satisfied, then sensing engine rpm (step 58); determining if the engine rpm is greater than or equal to 1600 (step 60); if step 60 is satisfied, determining if the step 60 condition has existed for more than fifteen minutes (step 62); and interrupting compressor operation for three seconds if step 62 is satisfied (step 64). This flow chart illustrates that, if the ambient temperature is greater than 95° F., it will satisfy the appropriate steps 66, 68, 70, 72, 74, 76, and the engine rpm will be sensed (steps 78, 80, 82, 86, 88, 90). In accordance with the detected ambient temperature, a comparison will be made to determine if the engine rpm is above a predetermined level between 1600 and 1200 rpm (steps 92, 94, 96, 98, 100, 102, 104). Next, a decision will be made regarding whether the engine rpm has been above the predetermined level for a predetermined period of time between 12 minutes and 5 minutes (steps 106, 108, 110, 112, 114, 116, 118). If the predetermined engine rpm condition has existed for greater than or equal to the predetermined period of time as defined in steps 106–118, then the compressor operation is interrupted for a predetermined period of time between four seconds and nine seconds (steps 120, 122, 124, 126, 128, 130, 132).

These algorithms are vehicle dependent. The engine rpm, vehicle speed control point, ambient temperature control point, cycle period, compressor enable pressure and compressor off duration may vary for different styles of vehicles. The duty cycle should be transparent to the air conditioning system operation, i.e., the vehicle passenger should be unaware that the compressor operation has been interrupted.

While the best modes for carrying out the invention have been described in detail, those familiar with the art to which this invention relates will recognize various alternative designs and embodiments for practicing the invention within the scope of the appended claims.

What is claimed is:

1. A method of preventing lock-in of a variable orifice in a vehicle air conditioning system which includes a compressor with a compressor outlet having a measurable head pressure and a variable orifice in fluid communication with the compressor outlet, the method comprising temporarily interrupting compressor operation under certain predetermined operating conditions in a manner to cause the head pressure to drop, thereby causing the variable orifice to open further to prevent lock-in.

2. The method of claim 1, wherein said step of temporarily interrupting compressor operation under certain predetermined operating conditions comprises:

sensing the head pressure; and temporarily interrupting compressor operation if the head pressure is greater than approximately 270 psig.

3. The method of claim 1, wherein said step of temporarily interrupting compressor operation under certain predetermined operating conditions comprises temporarily interrupting compressor operation for a predetermined period of time if the vehicle engine is operated at greater than approximately 75% of wide open throttle for more than approximately ten seconds.

4. The method of claim 3, wherein said step of temporarily interrupting compressor operation for a predetermined period of time comprises cycling the compressor off for approximately five seconds.

5. The method of claim 1, wherein said step of temporarily interrupting compressor operation comprises interrupting compressor operation for a period of approximately three seconds when the vehicle is operated at a speed of greater than approximately thirty miles per hour following an idling period of greater than approximately three minutes with the compressor on.

6. The method of claim 1, wherein said step of temporarily interrupting compressor operation comprises:

sensing the compressor gas discharge temperature; and temporarily interrupting compressor operation if the sensed discharge gas temperature is greater than approximately 250° F.

7. The method of claim 1, wherein said step of temporarily interrupting compressor operation under certain predetermined operating conditions comprises temporarily interrupting compressor operation if the engine rpm and ambient temperature are above certain predetermined levels for a predetermined period of time.

8. An article of manufacture used to direct a computer or other like programmable apparatus to control operation of an air conditioning system in a manner to prevent lock-in of a variable orifice, the air conditioning system including a compressor with a compressor outlet having a measurable head pressure and a variable orifice in fluid communication with the compressor outlet, the article of manufacture comprising:

a computer-readable storage medium; and a computer program represented as computer-readable data on the computer-readable storage medium, the computer program directing the computer to cycle the compressor off under certain predetermined operating conditions in a manner to cause the head pressure to drop, thereby causing the variable orifice to open further to prevent lock-in.

9. The article of manufacture of claim 8, wherein the computer program directs the computer to cycle the compressor off for a predetermined period of time if the vehicle engine is operated at greater than approximately 75% of wide open throttle for more than approximately ten seconds.

10. The article of manufacture of claim 8, wherein the computer program directs the computer to cycle the compressor off for a period of approximately three seconds when the vehicle is operated at a speed of greater than approximately thirty miles per hour following an idling period of greater than approximately three minutes with the compressor on.

11. The article of manufacture of claim 8, wherein the computer program directs the computer to cycle the compressor off if the engine rpm and ambient temperature are above certain predetermined levels for a predetermined period of time.

12. A vehicle air conditioning system, comprising:

a compressor having a compressor outlet with a measurable head pressure;

a variable expansion device in fluid communication with the compressor outlet; and a processor in electrical communication with said compressor, said processor being operative to cycle the compressor off under certain predetermined operating conditions in a manner to cause the head pressure to drop, thereby causing the variable orifice to open further to prevent lock-in.

13. The vehicle system of claim 12, wherein the processor is further operative to cycle the compressor off for a predetermined period of time if the vehicle engine is operated at greater than approximately 75% of wide open throttle for more than approximately ten seconds.

14. The vehicle air conditioning system of claim 12, wherein the processor is further operative to cycle the compressor off for a period of approximately three seconds when the vehicle is operated at a speed of greater than approximately thirty miles per hour following an idling period of greater than approximately three minutes with the compressor on.

15. The vehicle air conditioning system of claim 12, wherein the processor is further operative to cycle the compressor off if the engine rpm and ambient temperature are above certain predetermined levels for a predetermined period of time.

* * * * *